Feb. 27, 1968  C. P. CARAWAN  3,370,485
VARIABLE SPEED TRANSMISSIONS
Filed Nov. 8, 1965  2 Sheets-Sheet 1
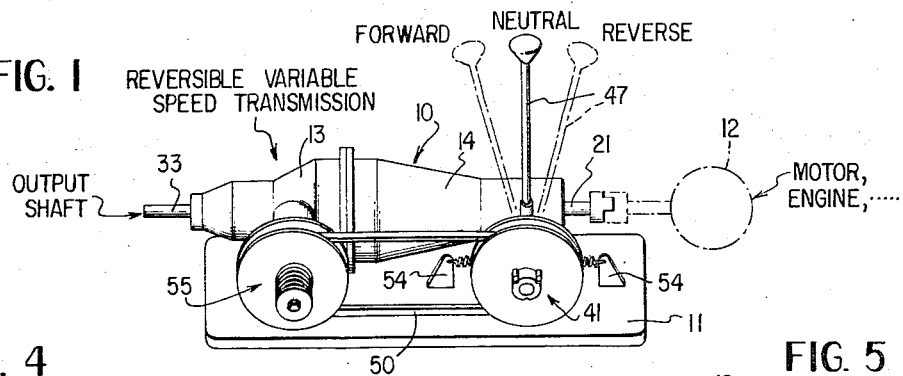
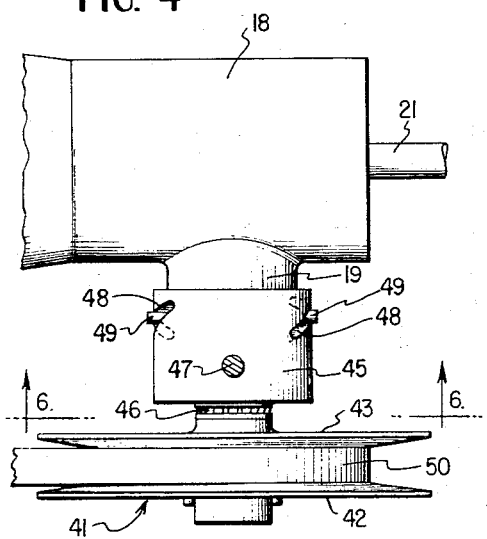
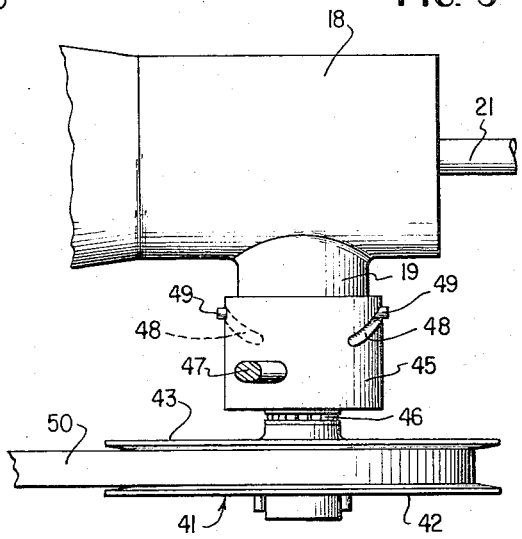
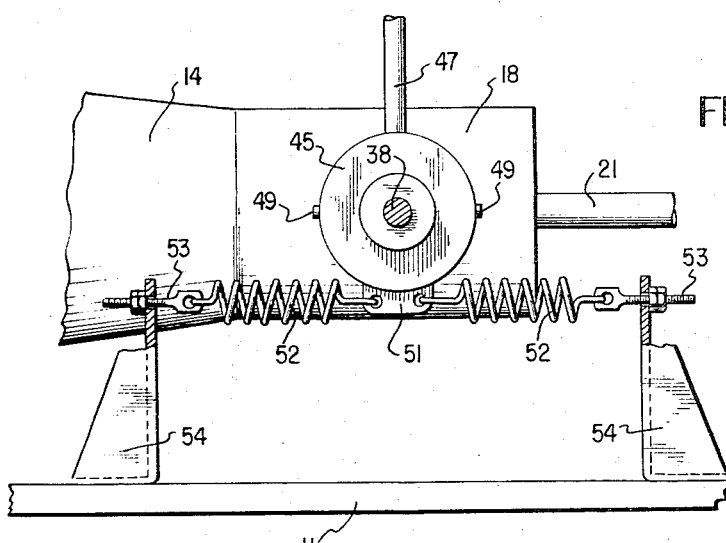
INVENTOR
CLARENCE P. CARAWAN
BY
B. P. Fishburne, Jr.
ATTORNEY Feb. 27, 1968     C. P. CARAWAN     3,370,485

VARIABLE SPEED TRANSMISSIONS

Filed Nov. 8, 1965     2 Sheets-Sheet 2

INVENTOR
CLARENCE P. CARAWAN

BY *B. P. Fishburn, Jr.*

ATTORNEY

United States Patent Office 3,370,485
Patented Feb. 27, 1968

3,370,485
VARIABLE SPEED TRANSMISSIONS
Clarence P. Carawan, Summerville, S.C., assignor of one-fourth to J. P. Ballington and J. W. Ballington Jr., both of Summerville, S.C.
Filed Nov. 8, 1965, Ser. No. 514,427
2 Claims. (Cl. 74—689)

ABSTRACT OF THE DISCLOSURE

A compact and housed variable speed transmission having axially aligned input and output shafts connected within the housing with a planetary-type rotary differential gear unit. Externally of the housing is disposed adjustable speed control means in the form of a pair of variable diameter pulleys and a transmission belt engaging the pulleys. The pulleys are connected with shafts transverse to said aligned input and output shafts and one transverse shaft is connected through gears with the input shaft and the other transverse shaft is connected through gears with the differential unit.

This invention relates to a variable speed transmission.

The object of the invention is to provide a transmission of simplified and highly compact construction and adapted for a wide range of uses for transmitting power at infinitely variable speeds, both forwardly and in reverse, to a driven instrumentality. It is contemplated to employ the transmission upon certain farm tractors, and like vehicles, and also for certain stationary power applications. The invention is characterized by ruggedness and durability and by the absence of bulk, so that relatively little space is required for installation.

Another object of the invention is to provide transmission control means which are very smooth in operation in all positions from neutral to full speed, both forwardly and in reverse.

Other objects and advantages of the invention will be apparent during the course of the following detailed description.

In the accompanying drawings forming a part of this application and in which like numerals are employed to designate like parts throughout the same, FIGURE 1 is a side elevation in perspective of the transmission embodying the invention;

FIGURE 4 is an enlarged fragmentary plan view of a variable pulley in one adjusted position;

FIGURE 5 is a similar view of the pulley in another adjusted position; and

FIGURE 6 is a fragmentary vertical section taken on line 6—6 of FIGURE 4.

Figure 2:
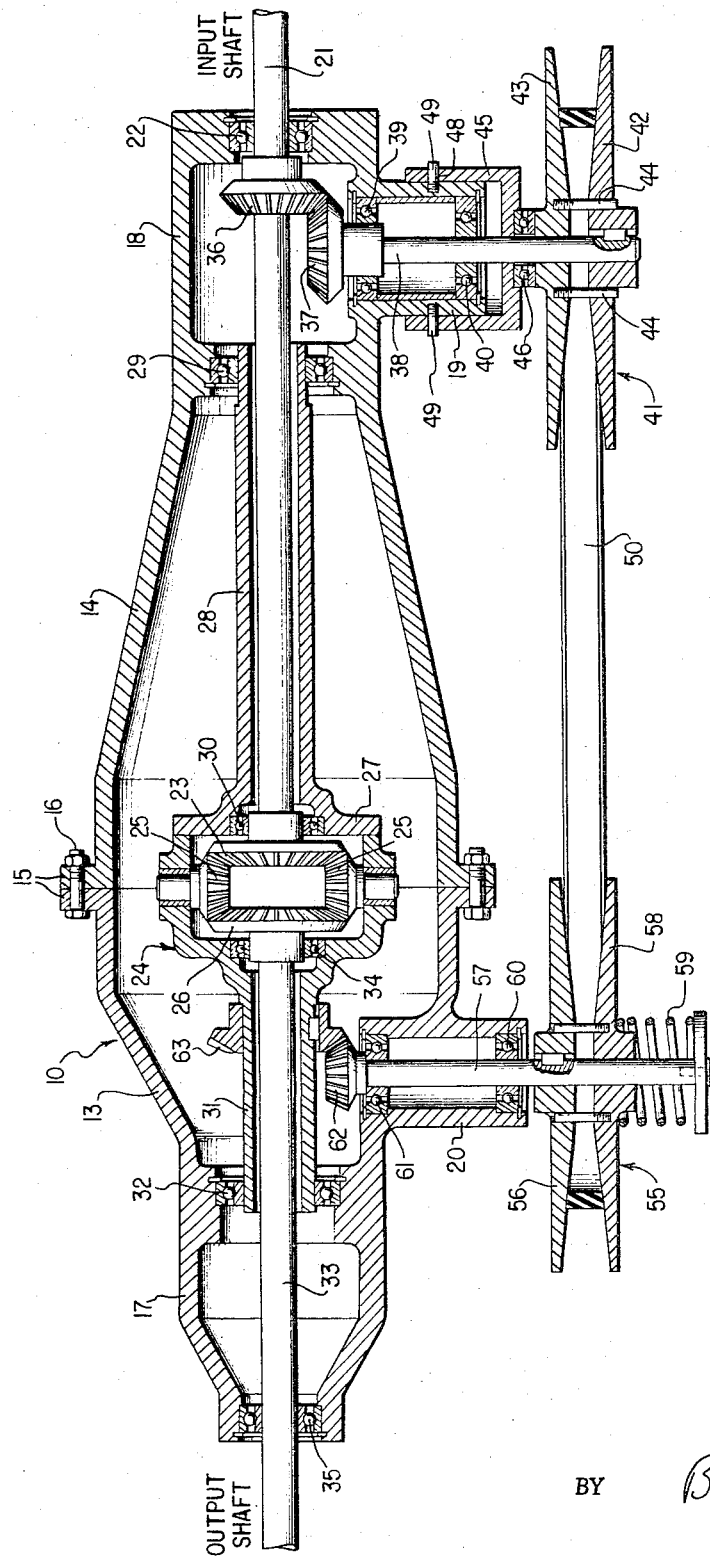
FIGURE 2 is an enlarged central horizontal cross section through the transmission as shown in FIGURE 1.

In the drawings, wherein for the purpose of illustration is shown a preferred embodiment of the invention, attention is directed first to FIGURE 1 showing the transmission 10 in its entirety mounted upon a suitable base 11 and coupled with a driving motor or engine 12 of any preferred type. The illustration in FIGURE 1 in connection with the mounting of the transmission on the base 11 merely represents a prototype unit and should not be taken in any limiting sense, because the transmission may be installed upon a tractor or the like or upon various types of supports depending upon where and how it is used.

With reference to the other figures of the drawings, the transmission proper comprises a main housing including longitudinally opposed housing sections 13 and 14 which are somewhat bell-shaped and axially elongated and slender for the purpose of compactness and simplicity. The housing sections 13 and 14 have abutting flanges 15 which are bolted together as at 16 near the longitudinal center of the unit. The housing sections 13 and 14 each have end hub or bearing portions 17 and 18 of reduced diameter, the latter portion 18 having a side integral bearing hub 19 projecting therefrom, as shown. A somewhat similar hub or sleeve 20 is integrally formed upon the side of the housing section 13 inwardly of the extension 17 or bearing portion. The elements 19 and 20 have their axes in a common horizontal plane with the major longitudinal axis of the main housing 13–14. The entire transmission housing is adapted to be maintained filled with suitable oil for efficient lubrication at all times.

With particular reference to FIGURE 2, the transmission includes an input shaft 21 suitably coupled with and driven by the prime mover 12, FIGURE 1. The input shaft 21 is journaled within a sealed-type ball bearing 22 contained within the outer end of bearing portion 18, this bearing preventing the escape of lubricant from the transmission housing. The shaft 21 extends to a point near the longitudinal center of the transmission and carries a bevel gear 23 constituting one component of a differential gear unit having a rotary spider 24, located centrally within the transmission. Journaled for rotation upon opposite sides of this spider are bevel pinions 25 of equal diameter and equal numbers of teeth, in mesh with the larger gear 23. Another bevel gear 26 of the differential unit identical to the gear 23 meshes with the pinions 25 in the usual manner so as to complete the differential gear unit.

The spider 24 may include a cover plate 27 having a long tube extension 28 surrounding the input shaft 21 and spaced therefrom. The outer extremity of tube extension 28 is journaled in a ball bearing 29 contained within the bearing portion 18 in spaced relation to the bearing 22. The inner end of input shaft 21 is further journaled within a ball bearing 30 contained within a recess of plate 27, so that the shaft 21 can turn with the tube extension 28 or relative thereto in some instances.

The differential spider 24 has another elongated tube extension 31 on the output side thereof in axial alignment with the tube extension 28 and having its outer end journaled in a ball bearing 32 contained within bearing portion 17. The two tube extensions 28 and 31 extend for the major portion of the length of the main transmission housing.

The bevel gear 26 is secured to a transmission output shaft 33 whose inner end portion is journaled in a ball bearing 34 contained within the spider 24, this output shaft extending axially through the tube extension 31 and being further journaled in a sealed ball bearing 35 at the outer end of bearing portion 17. The output shaft 33 may be coupled with any driven instrumentality.

Figure 3:
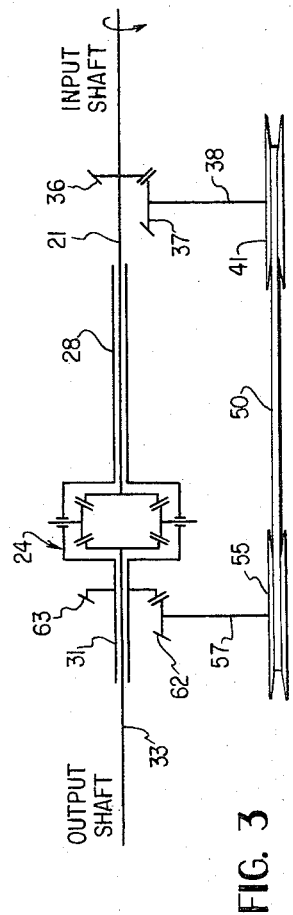
FIGURE 3 is a diagrammatic plan view of the transmission.

It may now be seen in reference to FIGURES 2 and 3 that there is a power path from the input shaft 21 to the output shaft 33 through the differential gear unit on the spider 24.

The input shaft 21 carries a bevel gear 36 thereon within the bearing portion 18, meshing constantly with a like right-angle bevel gear 37 on a transverse shaft 38 extending through the hub 19, as shown. The shaft 38 and its bevel gear are journaled in suitable ball bearings 39 and 40 within the hub 19, at least the bearing 40 being of the lubricant-sealing type.

A split variable diameter cone pulley 41 has an outer section 42 thereof rigidly mounted upon the outer end of shaft 38 and an inner section 43 axially slidably mounted on the shaft 38 in opposed relation to the section 42 and connected therewith by pins 44 which may slide within openings in the pulley section 42. A rotary control collar 45 surrounds the hub 19 slidably and carries a thrust-type bearing 46 at its outer end bearing against the inner pulley section 43 to effect smooth shifting thereof on the shaft 38. The control collar 45 has a radial control handle 47 secured thereto, FIGURES 4–6, and this control collar is further provided on opposite sides with diagonal slots 48, slidably receiving fixed pins 49 on the hub 19. Thus, by rotating the collar 45 upon the fixed hub 19 by utilizing the handle 47, the coaction of the slots and pins 48 and 49 causes the collar to shift inwardly or outwardly upon the hub and to correspondingly shift the pulley section 43 inwardly or outwardly relative to the section 42; therefore decreasing or increasing the effective diameter of the variable cone pulley 41. The pulley 41 is at all times connected with a transmission V-belt 50 whose tension is transmitted to the shiftable pulley section 43.

As shown in FIGURE 6, the control collar 45 has a bottom lug 51 connected with a pair of opposed retractile springs 52, whose outer ends are connected with adjusting screws 53, carried by fixed brackets 54 on the mounting 11. These two springs serve to maintain the collar 45 and the handle 47 in the neutral or zero speed position normally. The screws 53 permit adjusting the springs 52 to compensate for belt stretch or wear so as to maintain the neutral position of the collar 45. If preferred, the collar 45 and handle may be biased by a single spring only to one limit of movement of the collar as regulated by the slots 48 and pins 49.

The transmission belt 50 which extends parallel to the common axis of the input and output shafts 21 and 33 also engages a second self-adjusting variable cone pulley 55 having a fixed pulley section 56 on a countershaft 57 and a relatively movable section 58 backed up by a compression spring 59 on shaft 57. The shaft 57, which may be driven by the pulley 55, is journaled in ball bearings 60 and 61 within the hub 20, the outer bearing 60 having a lubricant seal.

The inner end of shaft 57 carries a relatively small bevel gear 62 meshing with a larger bevel gear 63 keyed to the tube extension 31 to turn therewith. There is preferably a 2:1 ratio or reduction between the gears 62 and 63 and preferably the same reduction or ratio between the smaller and larger gears of the differential unit, previously described.

In view of the above description, it should now be apparent that there is another power path through the transmission from the input shaft 21 and shaft 38, through the cone pulley drive and shaft 57, back to the differential and from the differential to the output shaft 33. FIGURE 3 corresponds to FIGURE 2 and is merely a simplified diagram showing the power paths of the variable speed transmission.

During operation and assuming that a suitable prime mover 12 is turning the input shaft 21 at a given speed, the following may take place. With the control handle 47 in the neutral position shown in FIGURE 6, the two pulleys 41 and 55 will be of equal diameter and the speeds of the shafts 38 and 57 as driven from the gear 36 will be equal. Under these circumstances, the net result through the transmission will be that the output shaft will be stationary, or its speed will be zero r.p.m.

When the operator shifts the control handle 47 and sleeve 45 in the direction for increasing the speed of shaft 57, this will result in increasing the speed of rotation of differential spider 24 and increasing the speed of output shaft 33 in the given direction or forwardly. This last condition is achieved by swinging the control handle 47 toward the position shown in FIGURE 5, where the diameter of pulley 41 is increased and the diameter of pulley 55 is decreased to thereby drive the shaft 57 faster. Again, the neutral condition is shown in FIGURE 2.

When the handle 47 is adjusted in the opposite direction for causing the speed of the shaft 57 to be less than the speed of the shaft 38, the speed of rotation of spider 24 is decreased and the output shaft 33 will then be driving in reverse compared to the input shaft 21. To cause this condition, the diameter of the pulley 41 is caused to be less than the effective diameter of the pulley 55 and of course the handle 47 will be swung in the opposite direction as indicated in FIGURE 1. FIGURES 4 and 6 also show the neutral condition.

It will now be obvious that the speed of output shaft 33 may be infinitely varied from zero speed up to the speed of input shaft 21 in either direction, that is, in the same direction of rotation as the shaft 21 or in the opposite direction thereto. The speed of the output shaft in either direction from neutral or zero will be equal to the difference between the speeds of the parallel shafts 38 and 57 for the particular 2:1 gear ratios previously mentioned.

It is to be understood that the form of the invention herewith shown and described is to be taken as a preferred example of the same, and that various changes in the shape, size and arrangement of parts may be resorted to, without departing from the spirit of the invention or scope of the subjoined claims.

What is claimed is:

1. A variable speed transmission comprising axially aligned input and output rotary shafts, housing means supporting and enclosing portions of said shafts, a rotary differential gear unit within the housing means and between the opposed ends of said input and output shafts and drivingly interconnecting said shafts, a first transverse shaft extending beyond one side of the input shaft at right angles thereto and exteriorly of the housing means, gearing positively interconnecting said input and first transverse shaft so that the former drives the latter, a variable diameter pulley on the first transverse shaft externally of the housing means, a fixed hub on the housing means surrounding the first transverse shaft, a control collar slidably mounted upon said hub and having diagonal slots in its side wall, fixed guide pins on said hub engaging through said slots, a radial operating handle on said control collar for turning the same relative to the hub, said control collar engaging one section of the first-named variable diameter pulley to shift the same axially on the first transverse shaft for varying the diameter of such pulley, a second transverse shaft journaled on the housing means in laterally spaced parallel relation to the first transverse shaft, an automatically responsive variable diameter pulley on the second transverse shaft, a transmission belt interconnecting said pulleys, fixed ratio gearing drivingly interconnecting the second transverse shaft and said rotary differential gear unit, and resilient means connected with said control collar for normally holding the same in a neutral position where the effective diameters of said pulleys are equal.

2. The invention as defined by claim 1, and wherein said resilient means comprises a lug on the control collar, a pair of opposed springs connected with said lug, and an adjustable anchoring means secured to and holding said springs and rendering their tension individually adjustable.

References Cited

UNITED STATES PATENTS

| Re. 24,347 | 8/1957 | Miner | 74—230.17 |
|---|---|---|---|
| 1,444,302 | 2/1923 | Bull | 74—230.17 |
| 2,332,838 | 10/1943 | Borgward | 74—689 |
| 2,377,013 | 5/1945 | Johnson | 74—689 |
| 2,392,149 | 1/1946 | Hornbostel | 74—689 |
| 3,046,814 | 7/1962 | Soehrman | 74—689 |
| 3,051,019 | 8/1962 | Seilber | 74—689 |

FOREIGN PATENTS 1,191,477  4/1959  France.

MARTIN P. SCHWADRON, *Primary Examiner.*

FRED C. MATTERN, *Examiner.*

J. A. WONG, *Assistant Examiner.*